July 20, 1926.
F. N. REEVES
1,592,903
INTERLOCKING CONTROL OF A PLURALITY OF TESTING UNITS
Filed May 13, 1924
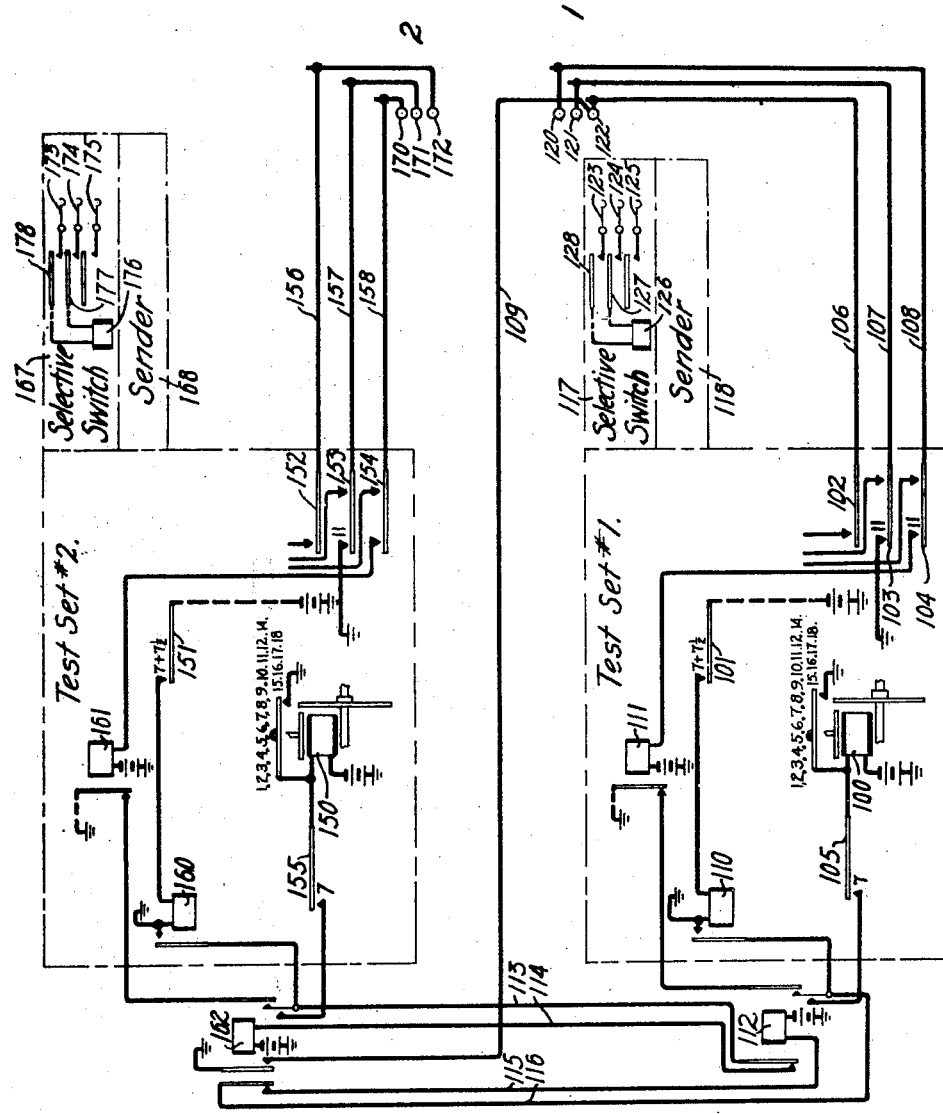
Inventor:
Frank N. Reeves
by E. W. Adams. Atty.

Patented July 20, 1926.

1,592,903

UNITED STATES PATENT OFFICE.

FRANK N. REEVES, OF WOODENSBURG, MARYLAND, ASSIGNOR TO WESTERN ELECTRIC COMPANY, INCORPORATED, OF NEW YORK, N. Y., A CORPORATION OF NEW YORK.

INTERLOCKING CONTROL OF A PLURALITY OF TESTING UNITS.

Application filed May 13, 1924. Serial No. 712,926.

This invention relates to a telephone exchange system, and more particularly to an interlocking control system for use in a telephone office where a plurality of testing units are in simultaneous operation.

It is an object of this invention to provide means whereby test lines in a single group may be used by a plurality of like testing units in simultaneous operation.

In some machine switching offices, a large number of the same type of selective switches are used and since selective switches are made up of parts that require careful adjustment, it is important that they be regularly tested to maintain them in an operative condition at all times for completing service connections. In offices using a large number of like selective switches it is desirable to use a plurality of automatic routine testing units, each testing unit arranged to test a given number of the selective switches.

The selective switches are directed under the control of each testing unit to a particular test line that is associated in operative relationship with the testing unit controlling the selective switch. From an economic basis, it is desirable to use only one group of bank multiple terminals for the test lines used by all of said plurality of testing units. To effect this economy it becomes necessary to use some means to prevent the simultaneous connection of more than one selective switch to any one of the test lines of said group and further to control the selection of a particular one of the test lines by the selective switch under test.

A feature of this invention is in the provision of interlocking control means to control the sequence of operation of a plurality of testing units and the selection of particular test lines in a single group of such lines.

This and other features of the invention will be apparent from the following description taken in connection with the accompanying drawing.

While the invention has been disclosed as particularly adapted for testing apparatus of a panel type machine switching office, it is apparent from the following description that the invention has a wider utility and that by slight modifications it could be adapted for testing other types of apparatus.

A single drawing accompanying this specification illustrates a plurality of testing units designated test set #1 and test set #2. These test sets are similar in construction and operation and are described in detail in patent to E. F. Trapp, No. 1,544,958, dated July 7, 1925. A detailed description of the testing units will, therefore, not be made in this specification. The operation of selective switches 117 and 167 and the senders 118 and 168 are the same as described in the aforementioned patent. The test lines 1 and 2 are located in a single group of frame multiples. Relays 112 and 162 are associated with test sets #1 and #2 to provide an interlocking system of control. This control is vested in the test set first advancing its apparatus to a particular position.

*Detailed description.*

Test set #1 and test set #2 are automatic routine testing units for testing selective switches. Let it be assumed that these selective switches are of the type commonly known as "districts" that are controlled by senders. The selective switches may be divided into groups, the switches of each group being tested by an associated testing unit. The test lines to which the selective switches are directed are in one group of the district multiple. Test line 1 is represented by terminals 120, 121, and 122 and test line 2 is represented by terminals 170, 171 and 172.

Let it be assumed that test sets #1 and #2 are both in operation and that test set #2 has seized selective switch 167 preparatory to directing it to test line 2. During the operation of test set #2, the sequence switch 150 shown therein is rotated to position 7. Let it further be assumed that test set #1 has seized selective switch 117 preparatory to directing it to test line 1 but that the sequence switch of test set #1 has not rotated to position 7. In position 7 of the sequence switch 150 of test set #2 a circuit is established to operate relay 160 preparatory to the establishment of circuits for control of the test lines. The circuit to operate relay 160 may be traced from ground through its winding, contact of cam 151 to grounded battery. The operation of relay 160 established a circuit to operate relay 162 from grounded battery through its winding, conductor 114, left contact of relay 112, conductor 113 to ground through the contact of relay 160. The operation of relay 162 establishes a circuit to characterize test line 1 as busy, from ground through the left inner contact of relay 162 to terminal 122. The operation of relay 162 opens at its left outer contact the circuit path over which relay 112 would normally be operated in the functioning of test set #1. The operation of relay 162 further establishes a circuit to energize magnet 150 of the sequence switch, test set #2. This circuit may be traced from grounded battery through the winding of magnet 150, contact of cam 155, right continuity contact of relay 162 to ground through the contact of relay 160 or to ground through the normal contact of relay 161. Upon the rotation of the sequence switch, the actuating circuit for relay 160 is opened at cam 151 to cause its release. The release of relay 160 opens the original actuating circuit for relay 162 a holding circuit for this relay is however maintained from ground through the normal contact of relay 161, right contact of relay 162, left contact of relay 112, to grounded battery through the winding of relay 162. Since the energizing circuit for sequence switch magnet 100, test set #1 for advancing it out of position 7, is only established when relay 112 is in an operated position, it is apparent that if the test set #1 should rotate the sequence switch into position 7, the circuit for the further rotation of the sequence switch could not be established until relay 162 has released.

The selective switch 167 is now controlled by test set #2 and the sender to direct it to the group of test lines containing test lines 1 and 2. Brushes 173, 174 and 175 of selective switch 167 are first brought into contact with test line 1. Since the sleeve terminal 122 of test line 1 is characterized as busy by the ground potential from the left inner contact of relay 162, a circuit is established over brush 175 to actuate the updrive magnet of selective switch 167 to cause its advance to test line 2. The energization of the updrive magnet in this manner causes the selective switch to hunt for a trunk in the well known manner of operation for selective switches of this type and will not be described further. When the selective switch is advanced to test line 2 it is arrested in its upward movement since the sleeve terminal 172 is not characterized by a busy ground.

When brushes 173, 174 and 175 are positioned upon the terminals of test line 2, the energizing circuits for the hunting apparatus of the selective switch are opened to advance the sequence switch associated therewith to its talking position. Let it be assumed that the test set #2 has advanced its sequence switch to position 11 in the manner described in the aforementioned patent to E. F. Trapp. When the selective switch 167 has advanced its sequence switch to talking position, a circuit is established through its sequence switch contacts to operate relay 161 of the test set. This circuit may be traced from grounded battery through the winding of relay 161, contact of cam 154, conductor 158, terminal 170, brush 173, contact of cam 178, winding of polarized relay 176, contact of cam 177, brush 174, terminal 171, conductor 157, contact of cam 153 to ground. The operation of relay 161 opens the holding circuit for relay 162 to cause its release, the ground at the contact of relay 160 having been removed due to the release of relay 160 when sequence switch 150 advanced out of position 7½.

Let it be assumed that test set #1 has advanced its sequence switch to position 7 and that its progression has been arrested. In position 7 an obvious circuit is established to operate relay 110. Upon the release of relay 162, a circuit is established to operate relay 112. This circuit may be traced from grounded battery through its winding, conductor 115, left outer normal contact of relay 162, conductor 116 to ground through contact of relay 110. A holding circuit is established for relay 112 over a circuit traced through its right contact to ground through the normal contact of relay 111. The operation of relay 112 also establishes a circuit to actuate sequence switch magnet 100 from grounded battery through its winding, contact of cam 105 to ground through the contact of relay 110 or to ground through the normal contact of relay 111. The sequence switch of test set #1 is now advanced from position to position to control its local circuits and to control the selective switch 117. Under this control along with the control of the sender, the selective switch is directed to the group of test lines containing test lines 1 and 2. When brushes 123, 124 and 125 are brought into contact with terminals 120, 121 and 122 of test line 1, the upward movement of the selective switch is arrested since terminal 122 is not characterized as busy by ground potential. The release of the hunting apparatus in the selective switch establishes circuits to rotate the sequence switch of the selective switch into the talking position and at this time the sequence switch of test line 1 is arrested in position 11. A circuit is now established to energize relay 111 from grounded battery, through its winding, contact of cam 104, conductor 108, terminal 120, brush 123, contact of cam 128, winding of polarized relay 126, contact of cam 127, brush 124, terminal 121, conductor 107, contact of cam 103 to ground. The operation of relay 111 opens the holding circuit for relay 112 to cause its release, the circuit of relay 110 having been previously opened at cam 101 when sequence switch 100 advanced out of position 7½.

In the manner described during the operation of test set #1 and test set #2 in the same office, the first test set that rotates its sequence switch to position 7 prevents the alternate test set from progressing its sequence switch beyond position 7 until the selective switch associated with said first test set is positioned upon a particular test line.

What is claimed is:

1. In a testing system arranged to direct selective switches to the first line in a group of test lines, said switches being of a type that hunt an idle line in a group of lines, a plurality of test lines in a single group, a plurality of testing units each operating as a part of said testing system to direct particular ones of said selective switches to said single group of test lines, and means controlled by each testing unit to cause the selective switch associated therewith to be connected to a particular one of said test lines.

2. In a testing system arranged to direct selective switches to the first line in a group of test lines, said switches being of a type that hunt an idle line in a group of lines, a plurality of test lines in a single group, a plurality of testing units each operating as a part of said testing system to direct particular ones of said selective switches to said single group of test lines, and interlocking control means for the control of said plurality of testing units to successively direct associated selective switches to particular ones of said test lines.

3. In a testing system arranged to direct selective switches to the first line in a group of test lines, said switches being of a type that hunt an idle line in a group of lines, a plurality of test lines in a single group, a plurality of testing units each operating as a part of said testing system to direct particular ones of said selective switches to said single group of test lines, means controlled by each testing unit to cause the selective switch associated therewith to be connected to a particular one of said test lines, and means whereby each testing unit may control each other such testing unit in a manner to prevent simultaneous connection of a plurality of selective switches to one test line.

4. In a testing system arranged to direct selective switches to the first line in a group of test lines, said switches being of a type that hunt an idle line in a group of lines, a plurality of test lines in a single group, a testing unit operated as a part of said system to direct such switches to said test lines, a second testing unit operated as a part of said system to direct other of such switches to said test lines, and means to prevent said second testing unit from directing an associated switch to a test line during the time said first testing unit is directing an associated switch to a test line.

5. In a testing system arranged to direct selective switches to the first line in a group of test lines, said switches being of a type that hunt an idle line in a group of lines, a plurality of test lines in a single group, a testing unit operated as a part of said system to direct such switches to said test lines, a second testing unit operated as a part of said system to direct other of such switches to said test lines, means to prevent said second testing unit from directing an associated switch to a test line during the time said first testing unit is directing an associated switch to a test line, and means to cause the selective switch associated with said first testing unit to select a test line other than the first test line of said single group.

6. In a testing system arranged to direct selective switches to the first line in a group of test lines, said switches being of a type that hunt an idle line in a group of lines, a plurality of test lines in a single group, a testing unit operated as a part of said system to direct such switches to said test lines, a second testing unit operated as a part of said system to direct other of such switches to said test lines, means to prevent said second testing unit from directing an associated switch to a test line during the time said first testing unit is directing an associated switch to a test line, means to cause the selective switch associated with said first testing unit to select a test line other than the first test line of said single group, and means operative when said other test line has been selected to establish a condition whereby said second testing unit may function for directing a selective switch to a test line of said single group.

7. In combination, a plurality of selective switches of a type that hunt an idle line in a group of lines, a plurality of lines in a single group, a plurality of automatically progressive control units each operating to direct said selective switches to said single group of lines, and interlocking control means to regulate the selection of a particular line in said single group by a particular selective switch.

8. In combination, a plurality of selective switches of a type that hunt an idle line in a group of lines, a plurality of lines in a single group, a plurality of automatically progressive control units each operating to direct said selective switches to said single group of lines, and interlocking control means to regulate the progression of said control units and the selection of a particular line in said single group by a particular selective switch.

9. In combination, a plurality of selective switches of a type that hunt an idle line in a group of lines, a plurality of lines in a single group, a plurality of automatically progressive control units each operating to direct said selective switches to said single group of lines, and interlocking control means to regulate the progression of said control units, and the selection of particular lines in said single group by selective switches associated with particular ones of said control units.

10. In combination, a plurality of selective switches of a type that hunt an idle line in a group of lines, a plurality of lines in a single group, a plurality of automatically progressive control units each operating to direct said selective switches to said single group of lines and means controlled by each control unit to cause the selective switch associated therewith to be connected to a particular one of said lines.

In witness whereof, I hereunto subscribe my name this 9th day of May A. D., 1924.

FRANK N. REEVES.